(12) United States Patent
Samuel

(10) Patent No.: US 11,514,158 B2
(45) Date of Patent: Nov. 29, 2022

(54) IOT SECURITY SERVICE

(71) Applicant: Microsoft Technology Licensing, LLC, Redmond, WA (US)

(72) Inventor: Arjmand Samuel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/702,201

(22) Filed: Dec. 3, 2019

(65) Prior Publication Data

US 2020/0104484 A1    Apr. 2, 2020

Related U.S. Application Data

(63) Continuation of application No. 15/344,461, filed on Nov. 4, 2016, now Pat. No. 10,528,725.

(51) Int. Cl.
| | |
|---|---|
| *G06F 21/55* | (2013.01) |
| *H04W 4/70* | (2018.01) |
| *H04L 9/40* | (2022.01) |
| *G06F 21/86* | (2013.01) |
| *H04L 67/12* | (2022.01) |
| *H04W 68/12* | (2009.01) |
| *H04L 43/08* | (2022.01) |
| *H04W 12/65* | (2021.01) |

(52) U.S. Cl.
CPC .............. *G06F 21/55* (2013.01); *G06F 21/86* (2013.01); *H04L 63/14* (2013.01); *H04L 63/1425* (2013.01); *H04L 63/20* (2013.01); *H04L 67/12* (2013.01); *H04W 4/70* (2018.02); *H04W 68/12* (2013.01); *G06F 2221/2111* (2013.01); *H04L 43/08* (2013.01); *H04W 12/65* (2021.01)

(58) Field of Classification Search
CPC combination set(s) only.
See application file for complete search history.

(56) References Cited

U.S. PATENT DOCUMENTS

| | | |
|---|---|---|
| 9,478,132 B1 | 10/2016 | Dai |
| 10,291,477 B1 | 5/2019 | Askar |

(Continued)

FOREIGN PATENT DOCUMENTS

| | | |
|---|---|---|
| CN | 101479987 A | 7/2009 |
| CN | 103442353 A | 12/2013 |

(Continued)

OTHER PUBLICATIONS

"Final Office Action Issued in U.S. Appl. No. 15/436,107", dated Jan. 29, 2021, 33 Pages.

(Continued)

*Primary Examiner* — Harris C Wang
(74) *Attorney, Agent, or Firm* — Chin IP, PLLC

(57) ABSTRACT

The disclosed technology is generally directed to device security in an IoT environment. For example, such technology is usable in IoT security. In one example of the technology, a set of security rules that is associated with an expected condition of at least one IoT device is stored. IoT data associated with the at least one IoT device is received. The IoT data may be aggregated data that includes at least two different types of data. A determination is made, based on the IoT data, as to whether the set of security rules has been violated. An alert is selectively sent based on the determination.

19 Claims, 5 Drawing Sheets

(56) References Cited

U.S. PATENT DOCUMENTS

| | | | |
|---|---|---|---|
| 10,528,725 | B2 | 1/2020 | Samuel |
| 10,530,749 | B1 | 1/2020 | Park et al. |
| 10,972,456 | B2 | 4/2021 | Vasters et al. |
| 2003/0061344 | A1 | 3/2003 | Monroe |
| 2013/0060400 | A1 | 3/2013 | Hahne |
| 2015/0019553 | A1 | 1/2015 | Shaashua et al. |
| 2015/0058914 | A1 | 2/2015 | Yadav |
| 2015/0062008 | A1 | 3/2015 | Li et al. |
| 2015/0106876 | A1 | 4/2015 | Baldonado et al. |
| 2015/0134801 | A1 | 5/2015 | Walley et al. |
| 2015/0163121 | A1* | 6/2015 | Mahaffey ............ G06F 11/3466 707/687 |
| 2015/0262067 | A1 | 9/2015 | Sridhara et al. |
| 2015/0271003 | A1 | 9/2015 | Kuchi et al. |
| 2016/0119592 | A1 | 4/2016 | Stuart et al. |
| 2016/0197786 | A1 | 7/2016 | Britt et al. |
| 2016/0198536 | A1 | 7/2016 | Britt et al. |
| 2016/0212099 | A1* | 7/2016 | Zou ..................... H04L 63/0263 |
| 2016/0259043 | A1 | 9/2016 | Schar |
| 2016/0261465 | A1* | 9/2016 | Gupta ................. H04L 12/2816 |
| 2016/0313216 | A1* | 10/2016 | Pal ..................... B23Q 17/0971 |
| 2016/0315929 | A1 | 10/2016 | Childress et al. |
| 2016/0358184 | A1* | 12/2016 | Radocchia ........ G06K 19/07798 |
| 2017/0060911 | A1* | 3/2017 | Loscalzo .............. G06F 16/258 |
| 2017/0063798 | A1 | 3/2017 | Lapidous |
| 2017/0099353 | A1 | 4/2017 | Arora et al. |
| 2017/0180357 | A1 | 6/2017 | Ghosh et al. |
| 2017/0217433 | A1 | 8/2017 | Halder et al. |
| 2017/0235783 | A1* | 8/2017 | Chen ....................... H04L 67/12 707/691 |
| 2017/0359417 | A1 | 12/2017 | Chen et al. |
| 2017/0373855 | A1* | 12/2017 | Pritchard ................ H04L 67/12 |
| 2018/0096439 | A1 | 4/2018 | Davies et al. |
| 2018/0129805 | A1* | 5/2018 | Samuel ................... G06F 21/55 |
| 2019/0019087 | A1 | 1/2019 | Fukui |

FOREIGN PATENT DOCUMENTS

| | | |
|---|---|---|
| CN | 103701857 A | 4/2014 |
| CN | 103812869 A | 5/2014 |
| CN | 103986743 A | 8/2014 |
| CN | 104020751 A | 9/2014 |
| CN | 104102690 A | 10/2014 |
| CN | 104243406 A | 12/2014 |
| CN | 105072609 A | 11/2015 |
| CN | 105809330 A | 7/2016 |
| JP | 2016524209 A | 8/2016 |
| JP | 2016526207 A | 9/2016 |
| KR | 20160075158 A | 6/2016 |
| RU | 2589860 C2 | 7/2016 |
| WO | 2014112185 A1 | 7/2014 |
| WO | 2017189361 A1 | 11/2017 |

OTHER PUBLICATIONS

"Office Action Issued in European Patent Application No. 17798049.7", dated Feb. 3, 2021, 5 Pages.
"First Office Action and Search Report Issued in Chinese Patent Application No. 201780068009.8", dated Jan. 28, 2021, 15 Pages.
"Office Action and Search Report Issued in Colombia Patent Application No. NC2019/0004599", dated Jan. 25, 2021, 20 Pages.
"Non Final Office Action Issued in U.S. Appl. No. 15/458,916", dated Apr. 26, 2021, 31 Pages.
"Office Action Issued in Indonesian Patent Application No. P00201903672", dated Apr. 28, 2021, 4 Pages.
"Final Office Action Issued in U.S. Appl. No. 15/436,194", dated Nov. 3, 2020, 31 Pages.
"Non Final Office Action Issued in U.S. Appl. No. 15/436,194", dated Jul. 6, 2020, 27 Pages.
"Office Action and Search Report Issued in Colombia Patent Application No. NC2019/0004599", dated Jun. 18, 2020, 20 Pages.
"Non Final Office Action Issued in U.S. Appl. No. 15/436,107", dated Aug. 26, 2020, 51 Pages.
"Final Office Action Issued in U.S. Appl. No. 15/458,916", dated Sep. 23, 2020, 26 Pages.
"Non-Final Office Action Issued in U.S. Appl. No. 15/458,916", dated May 7, 2020, 22 Pages.
"Office Action Issued in European Patent Application No. 17797814.5", dated Apr. 6, 2020, 6 Pages.
"Office Action Issued in Chilean Patent Application No. 201901126", dated May 14, 2020, 12 Pages.
"Office Action Issued in Israel Patent Application No. 266252", dated Dec. 1, 2020, 6 Pages.
"Office Action Issued in Russian Patent Application No. 2019113327", dated Mar. 9, 2021, 13 Pages.
Russell, et al., "Security Guidance for Early Adopters of the Internet of Things (IoT)", In White paper of Cloud Security Alliance, Apr. 2015, pp. 1-54.
"Final Office Action Issued in U.S. Appl. No. 15/436,107", dated Feb. 20, 2020, 24 Pages.
"Final Office Action Issued in U.S. Appl. No. 15/436,194", dated Feb. 20, 2020, 33 Pages.
"Final Office Action Issued in U.S. Appl. No. 15/458,916", dated Feb. 13, 2020, 27 Pages.
"Notice of Allowance Issued in U.S. Appl. No. 15/344,451", dated Apr. 22, 2020, 10 Pages.
"Office Action Issued in Colombian Patent Application No. NC2019/0004599", dated Aug. 30, 2021, 22 Pages.
"Office Action Issued in Japanese Patent Application No. 2019-522908", dated Aug. 20, 2021, 11 Pages.
"Office Action Issued in Australian Patent Application No. 2017354886", dated Aug. 11, 2021, 3 Pages.
"Second Office Action and Search Report Issued in Chinese Patent Application No. 201780068009.8", dated Jul. 16, 2021, 6 Pages.
"First Office Action and Search Report Issued in Chinese Patent Application No. 201780068069.X", dated Jul. 30, 2021, 18 Pages.
"Office Action Issued in Indian Patent Application No. 201947018112", dated Aug. 12, 2021, 6 Pages.
"Office Action and Search Report Issued in Colombian Patent Application No. NC2019/0004599", dated May 7, 2021, 24 Pages.
"Office Action Issued in European Patent Application No. 17798049.7", dated Feb. 7, 2022, 4 Pages.
"Office Action Issued in Israel Patent Application No. 266252", dated Jan. 5, 2022, 8 Pages.
"Second Office Action Issued in Chinese Patent Application No. 201780068069.X", dated Mar. 1, 2022, 16 Pages.
"Office Action and Search Report Issued in Colombian Patent Application No. NC2019/0004599", dated Feb. 28, 2022, 46 Pages.
U.S. Appl. No. 15/458,916, filed Mar. 14, 2017.
U.S. Appl. No. 15/436,107, filed Feb. 17, 2017.
U.S. Appl. No. 15/436,194, filed Feb. 17, 2017.
"Office Action Issued in Japanese Patent Application No. 2019-522908", dated Apr. 18, 2022, 11 Pages.
"Office Action Issued in Mexican Patent Application No. MX/a/2019/005100", dated May 31, 2022, 8 Pages.
U.S. Pat. No. 10,972,456, filed Apr. 6, 2021.
U.S. Pat. No. 10,528,725, filed Jan. 7, 2020.
U.S. Appl. No. 15/458,916, dated Mar. 14, 2017.
U.S. Appl. No. 15/436,107, dated Feb. 17, 2017.
U.S. Appl. No. 15/436,194, dated Feb. 17, 2017.
"Office Action Issued in Chinese Patent Application No. 201780068069.X", dated Aug. 3, 2022, 11 Pages.
"Office Action Issued in Colombian Patent Application No. NC2019/0004599", dated Jul. 8, 2022, 38 Pages.
"Office Action Issued in New Zealand Patent Application No. 752213", dated Sep. 30, 2022, 4 Pages.

* cited by examiner

IOT SECURITY SERVICE

CROSS-REFERENCE TO RELATED APPLICATION(S)

This application is a continuation of U.S. patent application Ser. No. 15/344,461, filed Nov. 4, 2016, entitled "IOT SECURITY SERVICE". The entirety of this afore-mentioned application is incorporated herein by reference.

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to device security in an IoT environment. For example, such technology is usable in IoT security. In one example of the technology, a set of security rules that are associated with an expected condition of at least one IoT device is stored. IoT data associated with the at least one IoT device is received. The IoT data may be aggregated data that includes at least two different types of data. A determination is made, based on the IoT data, as to whether the set of security rules has been violated. An alert is selectively sent based on the determination.

Some examples of the disclosure include a system to monitor, detect and mitigate security threats to IoT devices using telemetry about the IoT device security state, and using other environmental data from other IoT devices. In some examples, telemetry data from multiple IoT devices in the environment is used, and a model of the environment is formed. In some examples, the resulting model is used to detect security threats such as intrusions and tampering.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
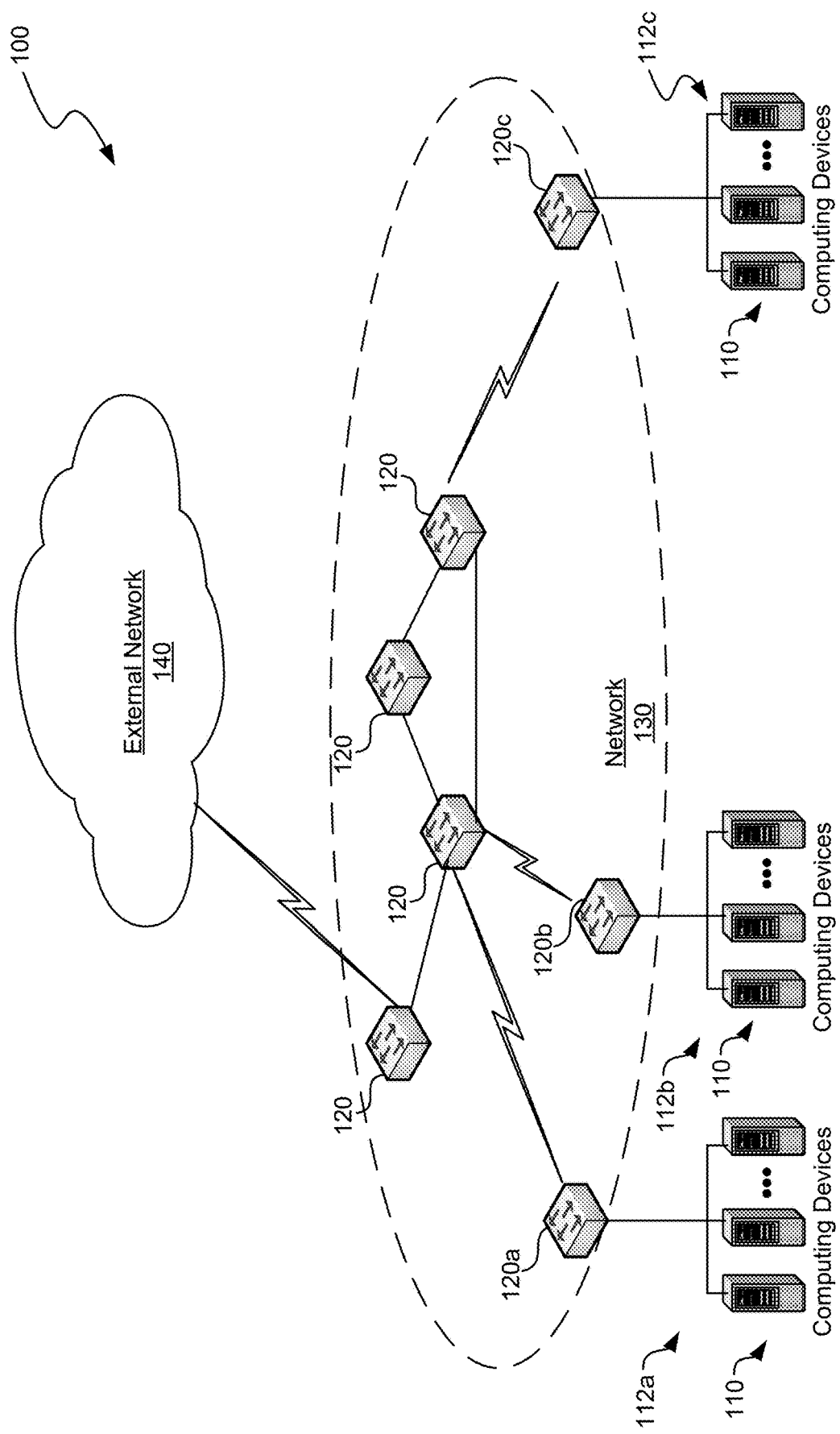
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "IoT hub" is not limited to one particular type of IoT service, but refers to the device to which the IoT device communicates, after provisioning, for at least one IoT solution or IoT service of any type. That is, the term "IoT hub," as used throughout the specification and the claims, is generic to any IoT solution.

Briefly stated, the disclosed technology is generally directed to device security in an IoT environment. For example, such technology is usable in IoT security. In one example of the technology, a set of security rules that is associated with an expected condition of at least one IoT device is stored. IoT data associated with the at least one IoT device is received. The IoT data may be aggregated data that includes at least two different types of data. A determination is made, based on the IoT data, as to whether the set of security rules has been violated. An alert is selectively sent based on the determination.

In some applications, IoT devices tend to be deployed remotely, potentially in adverse environments. Frequently such devices may not be physically accessible to the operators or owners to the device. Such devices may also be "in the wild" so that they are unattended and physically available to the public with no physical monitoring physical supervision, or physical security, and thus people may be able to physically tamper with the devices. It may be possible for someone to transfer malware to such a device, steal a certificate from such a device, or the like. Examples of the disclosure monitor the security of the devices, detect intrusions and/or threats to the device, and/or communicate such intrusions and/or threats to a remote party, e.g., a system or operator who might be able to mitigate the intrusion and/or threat.

Some examples of the disclosure include a system to monitor, detect, and/or mitigate security threats to IoT devices using telemetry information about the IoT device security state, using telemetry data, and using other environmental data from other IoT devices. In some examples, data collection agents are deployed on IoT devices, and the sensor data generated by such IoT devices is used to model and detect security threats to the IoT devices. These data collection agents may be configured remotely using configuration data.

In some examples, multiple agents on various IoT devices can be used to collect various types of data which can then be used conjuctively to form a more holistic model of device operation, and intrusion. In some examples, agent data from the IoT device itself is used to report the security state of the IoT device. In some examples, agent data from a collection of devices is used to form a model of the operating environment. In some examples, telemetry data from multiple IoT devices in the environment is used and a model of the environment is formed.

In some examples, the resulting model is used to detect security threats such as intrusions and/or tampering.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a gateway device, a device that comprises part or all of an IoT hub, a device comprising part or all of a device portal service, or the like, as discussed in greater detail below.

Illustrative Computing Device

Figure 2:
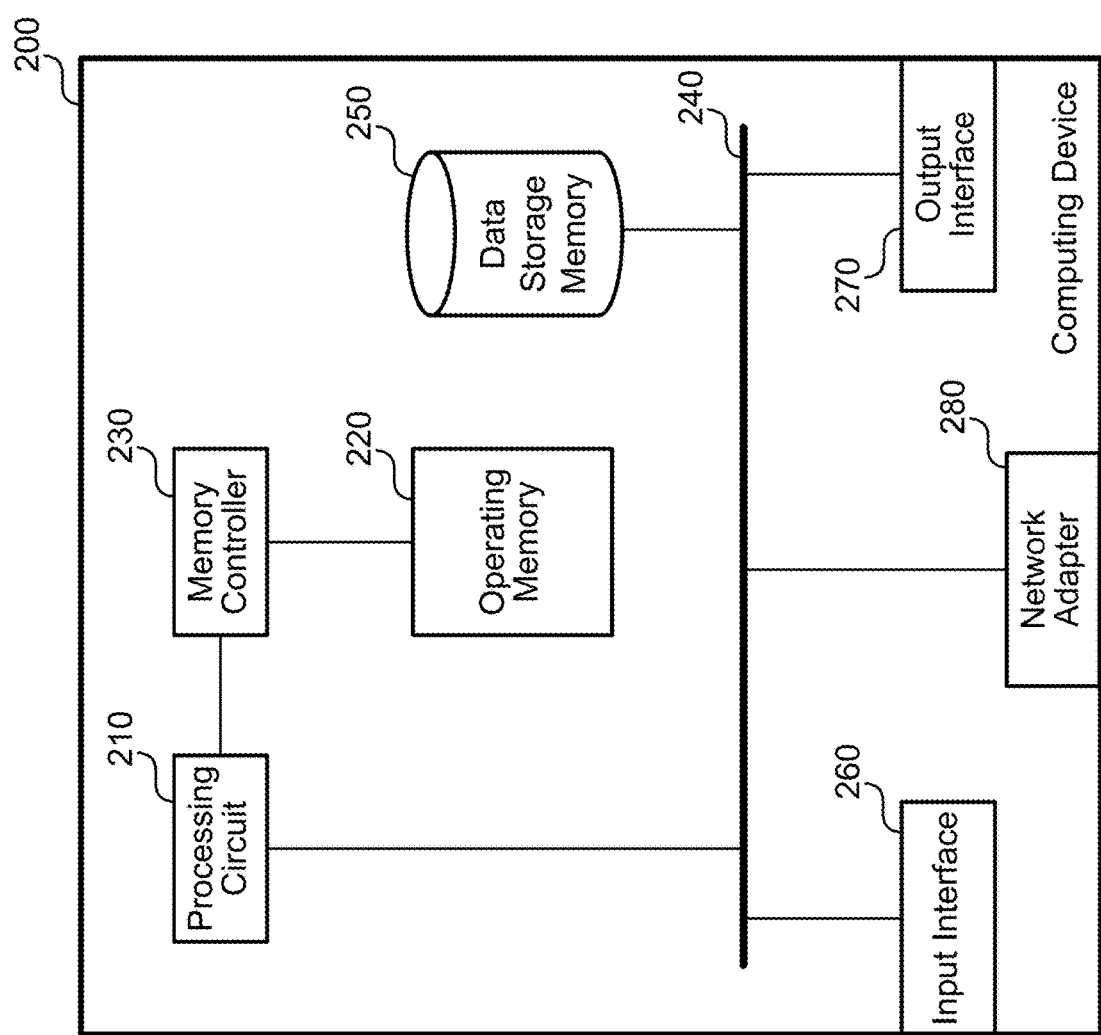
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate ($DDR_4$) memory, $3^{rd}$ generation double data rate ($DDR_3$) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is respectively adapted to execute processor-executable code that, in response to execution, enables computing device 200 to perform actions. In some examples, computing device 200 is enabled to perform actions such as the actions in the process of FIG. 4 or FIG. 5 below, or actions in a process performed by one or more of the computing devices in FIG. 3 below.

Illustrative System

Figure 3:
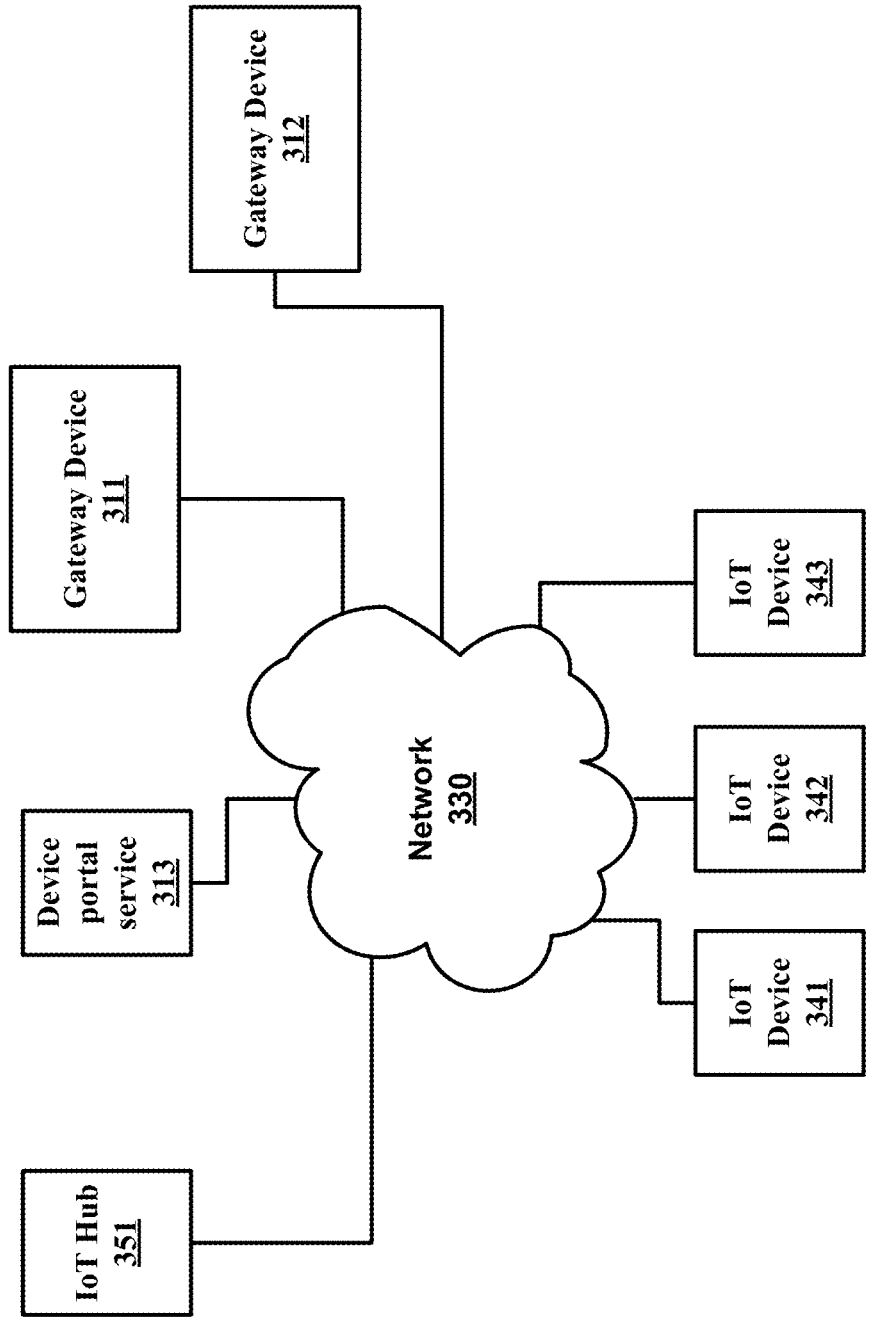
FIG. 3 is a block diagram illustrating an example of a system for IoT security.

FIG. 3 is a block diagram illustrating an example of a system (300) for IoT communications. System 300 may include network 330, IoT hub 351, IoT devices 341-343, gateway devices 311 and 312, and device portal service 313, which all connect to network 330. As previously discussed, the term "IoT hub" is not limited to one particular type of IoT service, but refers to the device to which the IoT device communicates, after provisioning, for at least one IoT solution or IoT service of any type. That is, the term "IoT hub," as used throughout the specification and the claims, is generic to any IoT solution. The term "IoT device" refers to a device that makes use of, or is intended to make use of, IoT services. An IoT device can include virtually any device that connects to the cloud to use IoT services, including for telemetry collection or any other purpose. Device portal service 313 includes one or more devices that provide a device portal. The term "IoT hub" refers to a device, or multiple devices such as a distributed system, to which IoT devices connect via the network for IoT services.

Each of the IoT devices 341-343, gateway devices 311 and 312, and/or the devices that comprise IoT hub 351 and/or device portal service 313 may include examples of computing device 200 of FIG. 2. FIG. 3 and the corresponding description of FIG. 3 in the specification illustrates an example system for illustrative purposes that does not limit the scope of the disclosure.

Network 330 may include one or more computer networks, including wired and/or wireless networks, where each network maybe, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT hub 351, IoT devices 341-343, gateway devices 311-312, and device portal service 313.

As one example, IoT devices 341-343 are devices that are intended to make use of IoT services provided by one or more IoT hubs, such as IoT hub 351. Device portal service 313 includes a device or multiple devices that perform actions in providing a device portal to users of IoT devices.

Optional gateway devices 311 and 312 are devices that may be used by some of the IoT devices 341-343 for accessing IoT hub 351. In some examples, after provisioning, some or all of the IoT devices 341-343 communicate to IoT hub 351 without using an intermediary. In other examples, some or all of the IoT devices 341-343 communicate with IoT hub 351 using an intermediary device such as one or more of gateway devices 311 and 312. Device portal service 313 is a service which may be used by users of IoT devices to manage IoT services for IoT devices including IoT devices 341-343.

System 300 may include more or less devices than illustrated in FIG. 3, which is shown by way of example only.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 4:
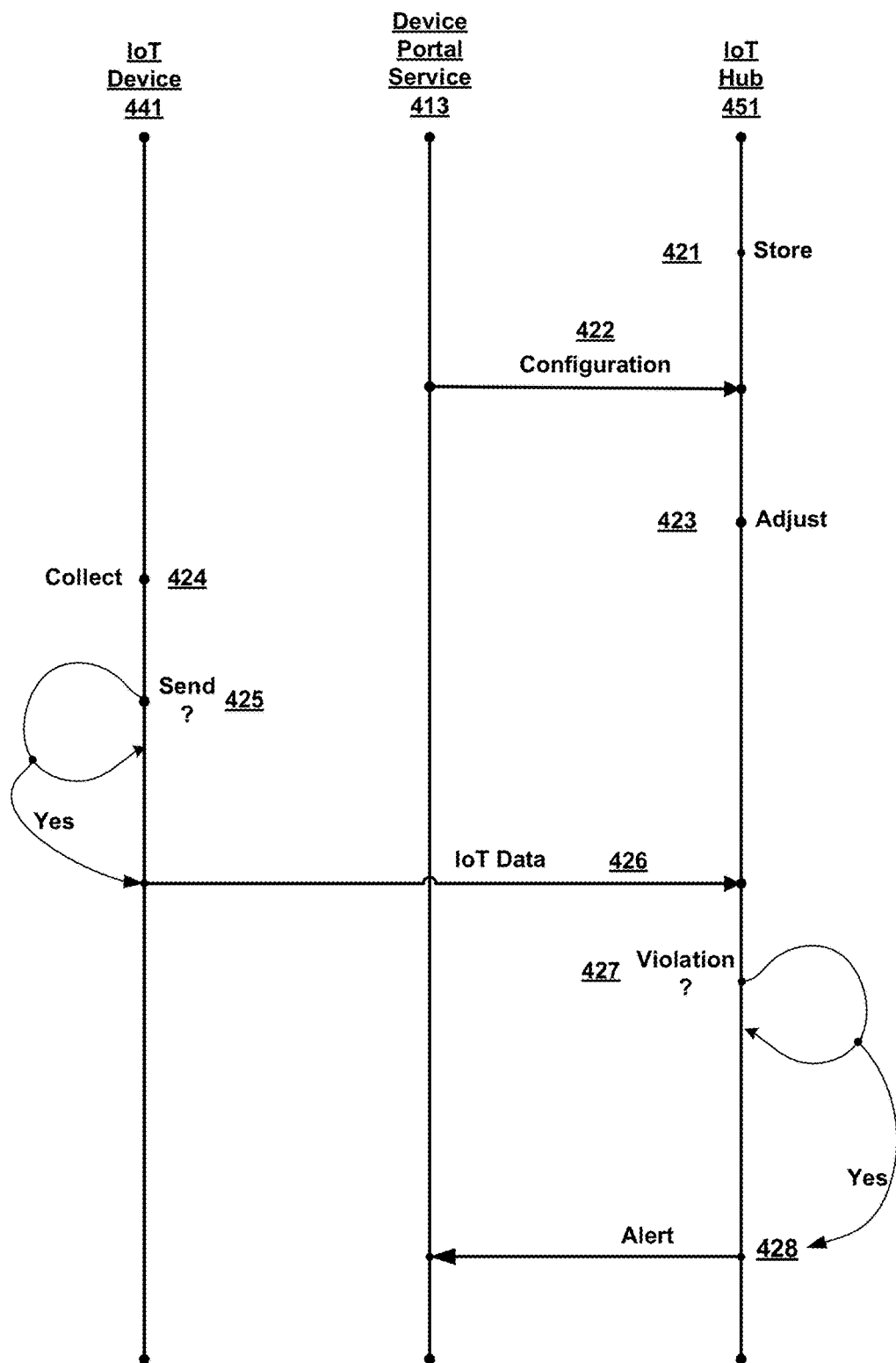
FIG. 4 is a diagram illustrating an example dataflow for a process for IoT security.

FIG. 4 is a diagram illustrating an example dataflow for a process (420) for IoT authentication. FIG. 4 and the corresponding description of FIG. 4 in the specification illustrate an example process for illustrative purposes that do not limit the scope of the disclosure.

In the illustrated example, first, step 421 occurs. At step 421, IoT hub 451 stores a set of security rules that is associated with an expected condition of at least one IoT device (e.g., IoT device 441). In some examples, the set of security rules is based upon an assessment of IoT data associated with at least one IoT device (e.g., IoT device 441). The set of security rules stored may differ, for example, based on the type of IoT device, upon the particular deployment context, and other factors. The set of security rules is discussed in greater detail below (after the discussion of the IoT data collected at step 424 below).

As shown, step 422 occurs next in some examples. In step 422, a configuration request may be generated by device portal service 413 and then the configuration request may be communicated from device portal service 413 to IoT hub 451. The configuration request may be associated with adjusting the set of security rules stored in IoT hub 451. In some examples, the configuration request is a request to change a set of security rules to an adjusted set of security rules. The configuration request can be made in different ways in different examples. In some examples, there is a basic mode in which the default set of security rules is used, and there is also an advanced setting where the user can make a configuration request to change default set of security rules. As shown, step 423 occurs next in some examples. At step 423, IoT hub 451 may adjust the set of security rules stored in IoT hub 451 based on the configuration request received from device portal service 413 at step 422.

As shown, step 424 occurs next in some examples. At step 424, IoT device 441 receives and collects environmental data from the environment, e.g., the environment in the vicinity of IoT device 441, and collects data about the internal security state of IoT device 441. The environmental data may include telemetry data, data indicating whether or not IoT device 441 has been physically tampered with, and/or the like. The telemetry data may include temperature, humidity, occupancy of a location associated with the IoT device, geolocation, and/or the like. The data about the internal security state of IoT device 441 may include operating system (OS) version, current state of the active processes, open ports, internet protocol (IP) addresses of devices connected, and/or the like. The data may be collected via software inputs, hardware inputs, or both.

The telemetry data collected at step 424 may include telemetry that the IoT device already collects in some examples. For example, an IoT device that is a temperature sensor may already be configured to collect temperature data.

IoT device 441 may have one or more tampering switches that detect physical tampering. In one example, the tampering switch is off if IoT device 441 has not been physically tampered with, and the tampering switch is on if IoT device 441 has been physically tampered with. The environmental data may include an indication as to whether the tampering switch is on or off. For instance, in some examples, IoT device 441 has a cover that is connected to two tampering switches. If the cover is opened, both tampering switches turn on.

In some examples, IoT device 441 may include a software agent that collects the environmental data and the data about the internal security of IoT device 441. In some examples, IoT device 441 has a software data collection agent deployed on IoT device 441 to collect environmental and/or internal state data. In some examples, some or all of the IoT devices have a software data collection agent deployed on the IoT device to collect environmental and/or internal state data from the IoT devices.

The set of security rules stored in IoT hub 451 is based on a model of the normal behavior of the IoT devices (e.g., 441 and/or 341-434 of FIG. 3). This model may represent the state of the IoT devices while these devices are working under normal conditions. In some examples, the set of security rules acts as a configurable IoT device model. The set of rules may be defined such that the set of rules is violated if an attack or other security intrusion or security threat occurs.

For example, the IoT devices may be subject to various types of security attacks which may be classified into two categories: cyber attacks and physical attacks. Cyber-attacks include attacks on the cyber properties of the devices, such as on the operating system, network infrastructure, connection, and data. Physical attacks include attacks such as physical tampering of the devices, manipulation of data generation elements of the devices, relocation, and the like. In some examples, the set of security rules is generated or adjusted such that violation of the set of security rules indicates at least a possibility of an attack (e.g., a physical attack or a cyber attack) on one or more IoT devices. Accordingly, once any of these attacks occur, a violation of the set of rules should occur in one example since the data collected from the devices will then be contrary to the model. The model may include one or more patterns for the telemetry data.

Accordingly, the set of security rules may define normal operating conditions which, if not met, may indicate the possibility of a security threat. For example, the set of security rules may be violated if one or more of the data elements is outside of an expected range. For example, the set of security rules may require that temperature is in a certain range, that the tampering switch is off, that certain blacklisted processes are not running, and/or the like. Expected ranges or expected discrete values may be contingent upon time of day and other factors. In some examples, rather than simply comparing each type of data such as temperature or the like to an expected range (or expected discrete value) individually, the set of security rules are based on multiple types of data considered together, based on a model. For instance, in some examples, temperature in the environment above the expected range might not result in a violation of the security rules unless there is also occupancy in the environment.

In some examples, the set of security rules are based on a model of the environmental and internal security data collected by the IoT devices, where the model effectively provides a "golden" image of the expected data. The golden image may reflect normal behavior of the IoT devices in normal operating conditions absent any intrusion or security threat. If, based on the received IoT data, some aspects differ from the golden image, the set of rules might be considered to be violated depending on other data. For instance, accordingly to the golden image for an occupancy sensor of a particular room in the mall, the occupancy sensor should not show occupancy during certain hours in which no one is expected to be present in the mall. However, the rules may specify that, for example, if the mall gate is open and the guard is still present in the mall, then the occupancy at the unexpected time does not trigger a violation of the set of security rules. In some examples, data from multiple IoT devices may be involved in the model and set of security rules in order to determine whether or not the set of rules have been violated. By using data from multiple IoT devices, a more holistic model of device operation and operating environment and intrusion may be used than if the model were based upon one IoT device.

In some examples, the set of security rules include one or both of a whitelist of processes and a blacklist of processes. The whitelist and blacklist of processes may be useful in determining whether or not an IoT device has been infected by malware. A "whitelist" of process refers to a list of approved processes, and a "blacklist" of processes refers to a list of prohibited processes.

In some examples, the collected IoT data, including collected telemetry data, can be used to assist in constructing the model in order to create or adjust the set of security rules.

As shown, step 425 occurs next in some examples. At step 425, IoT device 441 may make a determination as to whether or not to send data to IoT hub 451. In some examples, at step 425, IoT device 441 simply determines to always send all of the data to IoT hub 451. In some examples, data is only sent upon a threshold based on one of more of the types of data being exceeded.

For instance, in some examples, IoT device 441 makes a determination to send temperature data only if the temperature detected is outside of a predetermined range, such as 65-75 degrees Fahrenheit. In some examples, the fact that the temperature is outside of the range of 65-75 degrees Fahrenheit is not in and of itself a violation of the security rules—IoT device 441 does not make the determination about whether or not the set of security rules are violated, in this example, but only sends temperature data upon temperature being outside of a particular range, and for which therefore there might be a violation of the set of security rules depending on other factors.

As shown, step 426 occurs next in some examples when the determination at step 425 is positive. At step 426, the IoT data may be communicated from IoT device 441 to IoT hub 451. If, in contrast, the determination at step 426 is negative, other processing is resumed.

As shown, step 427 occurs next after step 426 in some examples. At step 427, IoT hub 451 makes a determination, based on the IoT data received at step 426, as to whether the set of security rules stored in IoT hub 451 has been violated. In some examples, the determination at step 427 is a comparison of the aggregated IoT device data with the configurable IoT device model.

As shown, step 428 occurs next in some examples. At step 428, IoT hub 451 selectively sends an alert to device portal service 413 based on the determination at step 427. If at step 427 it was determined that the set of rules were violated, IoT hub 451 communicates an alert to device portal service 413. If instead at step 427 it was determined that the set of rules were not violated, IoT hub 451 does not send out an alert.

If IoT device 441 becomes disconnected from the cloud, data cannot be collected from IoT device 441, but the fact that IoT device 441 is disconnected from the cloud is itself a form of information and in some examples an alert may result from IoT device 441 being disconnected from the cloud.

In some examples, the set of security rules may be further adjusted over time, both to reduce false positives, and to successfully detect attacks that might otherwise not be detected. In some examples, IoT hub 451 includes a learning layer that learns from anomalies and adapts by changing the set of security rules over time and learning over time.

In some examples, rather than sending the IoT data directly to IoT hub 451, IoT device 441 sends the data to a gateway device (e.g., gateway device 311 or 312 of FIG. 3). In some examples, the gateway device, rather than IoT device 441, makes the determination as to whether or not to send the IoT data to IoT hub 451. In some examples, multiple different IoT devices (e.g., 341-343 of FIG. 3) send IoT data to one gateway device, which aggregates the data before determining whether and which IoT data to send on to IoT hub 451.

In some examples, at step 428, rather than simply sending out an alert, other details, including, for example, information about the nature of the attack or threat, as far as can be determined, is also communicated from IoT hub 451 to device portal service 413 along with the alert. For example, if IoT hub 451 determines both through GPS that a device has been moved and from other IoT data that malware has been installed, then the nature of this attack can be communicated from IoT hub 451 to device portal service 413, which is potentially a different scenario than if only one of these two events had occurred. Aggregate data from multiple IoT devices can also be used, when applicable, to further describe the nature of the security threat in a communication from IoT hub 451 to device portal service 413.

Figure 5:
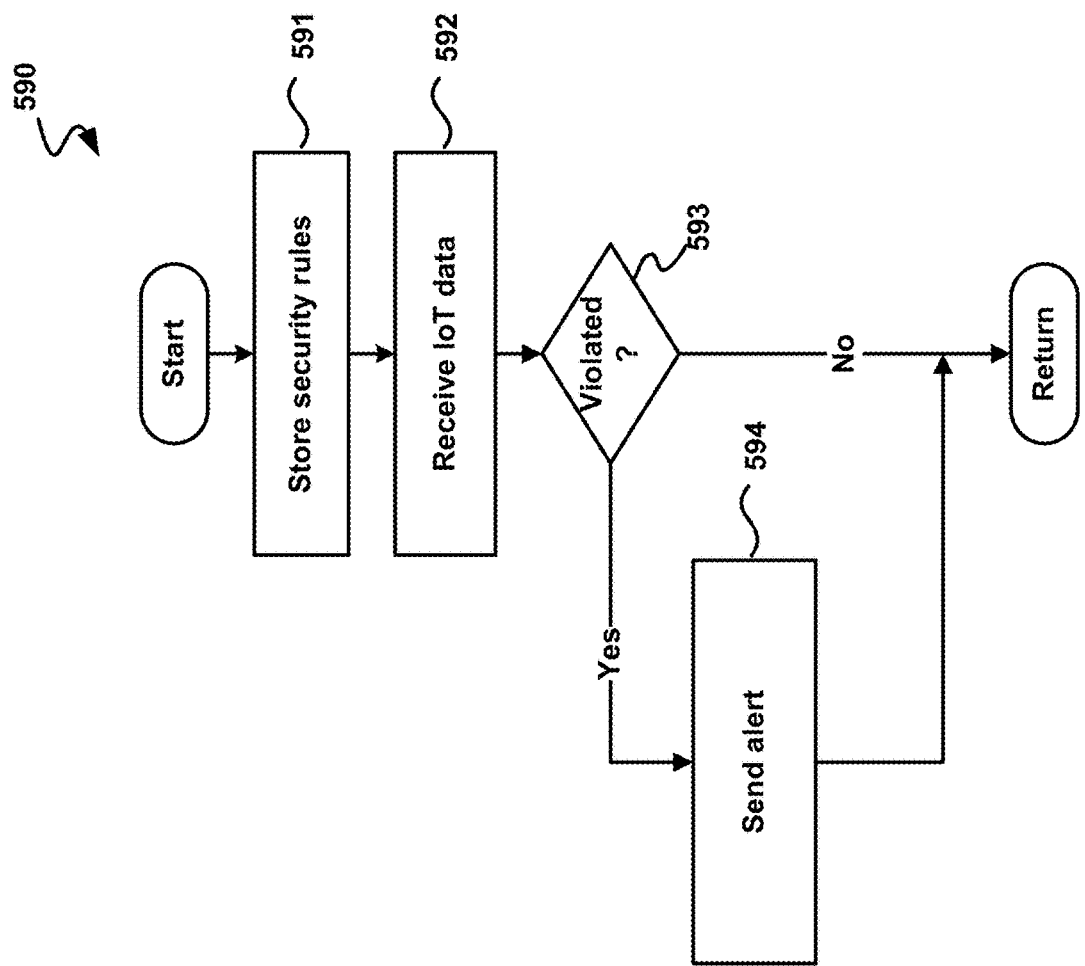
FIG. 5 is a logical flow diagram illustrating an example of a process for IoT security, in accordance with aspects of the present disclosure.

FIG. 5 is a logical flow diagram illustrating an example of a process (590) for IoT authentication. In one example, process 590 is performed by an IoT hub, such as IoT hub 351 of FIG. 1. After a start block, the process proceeds to block 591. At block 591, a set of security rules that is associated with an expected condition of at least one IoT device is stored. The process then moves to block 592. At block 592, IoT data associated with the at least one IoT device is received. The IoT data may be aggregated data that includes at least two different types of data. The process then proceeds to decision block 593.

At decision block 593, a determination is made, based on the IoT data, as to whether the set of security rules has been violated. If the determination at decision block 593 is negative, the process proceeds a return block, where other processing is resumed. If, instead the determination at decision block 593 is positive, the process advances to block 594, where an alert is sent. For instance, in some examples, the alert is sent a device portal service. The process then proceeds to a return block, where other processing is resumed. In this way, an alert is selectively sent based on the determination at decision block 593.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. An apparatus for Internet of Things (IoT) security, comprising:
an IoT hub including one or more devices, the devices including at least one memory adapted to store run-time data for the devices, and at least one processor that is adapted to execute processor-executable code that, in response to execution, enables the IoT hub to perform actions, including:
generating a configurable IoT device model;
storing a set of security rules that are associated with an expected condition of at least one IoT device;
receiving IoT data associated with the at least one IoT device in response to a determination, by the at least one IoT device, that a threshold for one or more of types of data has been exceeded, wherein the IoT data is aggregated data that includes at least two different types of telemetry data, and wherein the IoT data further includes: a current state of active processes on the at least one IoT device and a status of a tampering switch on the at least one IoT device;
making a determination, based on the IoT data, including: the the current state of active processes on the at least one IoT device and the status of the tampering switch on the at least one IoT device, and on the IoT device model, as to whether the set of security rules has been violated; and
selectively sending an alert based on the determination.

2. The apparatus of claim 1, the actions further including:
receiving a configuration request; and
adjusting the set of security rules based on the configuration request.

3. The apparatus of claim 1, wherein the IoT data is received from a data collection agent deployed on the at least one IoT device.

4. The apparatus of claim 1, wherein the at least one IoT device includes a plurality of IoT devices, and wherein the IoT data is received from data collection agents deployed on the plurality of IoT devices.

5. The apparatus of claim 1, wherein the set of security rules include at least one of a whitelist of processes and a blacklist of processes.

6. The apparatus of claim 1, wherein the IoT data is aggregated from multiple IoT devices including the at least one IoT device.

7. The apparatus of claim 1, wherein the aggregated data of the IoT data includes environmental data and internal state data.

8. The apparatus of claim 7, wherein the environmental data includes at least one of temperature, humidity, sensed location, or geolocation.

9. The apparatus of claim 7, wherein the internal data includes at least one of operating system version, open ports, or information associated with devices connected to the at least one IoT device.

10. The apparatus of claim 1, wherein the set of security rules are such that violation of the set of security rules indicates at least a possibility of an attack, wherein the attack is at least at least one of a physical attack or a cyber attack on the at least one IoT device.

11. The apparatus of claim 10, selectively sending the alert based on the determination further includes selectively sending information about the attack with the alert.

12. A method for Internet of Things (IoT) security, comprising:
generating a configurable IoT device model;
storing a set of security rules that are associated with an expected condition of at least one IoT device;
receiving aggregated IoT device data from the at least one IoT device, when the at least one IoT device determines to send the IoT data in response to a threshold based on one or more types of data being exceeded, wherein the aggregated data IoT device data includes at least two different types of telemetry data, and wherein the IoT data further includes: a current state of active processes on the at least one IoT device and a status of a tampering switch on the at least one IoT device;
employing at least one processor to compare the aggregated IoT device data, including: the current state of active processes on the at least one IoT device and the status of the tampering switch on the at least one IoT device, with the configurable IoT device model as to whether the set of security rules has been violated; and
selectively sending an alert based on the comparison.

13. The method of claim 12, wherein the at least one IoT device includes a plurality of IoT devices, and wherein the aggregated IoT device data is received from data collection agents deployed on the plurality of IoT devices.

14. The method of claim 12, wherein the aggregated data IoT device data includes environmental data and internal state data.

15. The method of claim 12, further comprising:
receiving a configuration request; and
adjusting the configurable IoT device model based on the configuration request.

16. A device, comprising:
a memory and a processor, wherein the memory and the processor are respectively configured to store and execute instructions for causing the device to perform operations for Internet of Things (IoT) security, the operations comprising:
generating a configuration request, wherein the configuration request is a request to change a set of security rules to an adjusted set of security rules, wherein the adjusted set of security rules is associated with an expected condition of at least one IoT device, wherein the adjusted set of security rules is based upon an assessment of IoT data associated with each of a plurality of IoT devices, and wherein the IoT data is aggregated data that includes at least two different types of data from the plurality of IoT devices such that the applying the adjusted set of security rules is based on a combination of at least two different types of telemetry data from at least two of the plurality of IoT devices considered together, and wherein the IoT data further includes: a current state of active processes on the at least one IoT device and a status of a tampering switch on the at least one IoT device;
sending the configuration request to an IoT hub; and
receiving an alert from the IoT hub upon the IoT hub making a determination that the adjusted set of security rules has been violated, wherein the determination is based on: the current state of active processes on the at least one IoT device and the status of the tampering switch on the at least one IoT device.

17. The device of claim 16, wherein the adjusted set of security rules are based upon an assessment of IoT data associated with the at least one IoT device such that the at least one IoT device is a plurality of IoT devices.

18. The device of claim 16, wherein the aggregated data of the IoT data includes environmental data and internal data.

19. The device of claim 18, wherein the environmental data includes at least one of temperature, humidity, sensed location, or geolocation, and wherein the internal data includes at least one of operating system versions, or information associated with devices connected to the at least one IoT device.

* * * * *